US006949760B2

(12) United States Patent
Kuranishi (10) Patent No.: US 6,949,760 B2
(45) Date of Patent: Sep. 27, 2005

(54) RADIATION IMAGE DETECTOR

(75) Inventor: Hideaki Kuranishi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/860,492

(22) Filed: Jun. 4, 2004

(65) Prior Publication Data

US 2004/0245486 A1 Dec. 9, 2004

(30) Foreign Application Priority Data

Jun. 6, 2003 (JP) ........................................ 2003-162191

(51) Int. Cl.[7] .............................................. G01T 1/00
(52) U.S. Cl. ....................................................... 250/591
(58) Field of Search ................................. 250/580, 591

(56) References Cited

U.S. PATENT DOCUMENTS

2004/0051063 A1 * 3/2004 Shoji ........................... 250/580

FOREIGN PATENT DOCUMENTS

JP    2000-284056 A    10/2000

* cited by examiner

Primary Examiner—David Porta
Assistant Examiner—Marcus Taningco
(74) Attorney, Agent, or Firm—Sughrue Mion, PLLC

(57) ABSTRACT

A radiation image detector capable of producing an appropriate synchronization signal for reading out image signals from the detector with a simple structure. A synchronization signal generating electrode is provided in parallel with the striped electrode comprised of a plurality of linear electrodes for reading out the radiation image, which is formed such that a section greater than or equal to a threshold size and a section smaller than the threshold size in width in the direction substantially orthogonal to the longitudinal direction of the striped electrode are disposed alternately in the longitudinal direction of the striped electrode, and the sections greater than or equal to the threshold size are disposed in the longitudinal direction at a predetermined pitch. Charges that change cyclically in amount are read out from the radiation image recording section through the synchronization signal generating electrode to generate the synchronization signal.

5 Claims, 6 Drawing Sheets

RADIATION IMAGE DETECTOR

BACKGROUND OF THE INVENTION

1. Field of the invention

The present invention relates to a radiation image detector for recording a radiation image by irradiating an image-carrying radiation on the detector to store charges in proportion to the dose of the radiation irradiated on the detector and detecting the radiation image stored in the detector as electrical signals by scanning a linear reading light over the detector and reading out the charges stored in the detector at a predetermined readout timing.

2. Description of the Related Art

Radiation image detectors for recording a radiation image by storing charges in the storage section of the detector in proportion to the dose of radiation, such as X-ray transmitted through a subject are widely used for obtaining, for example, medical radiation images, and various types of the detectors have been proposed.

One such detector is proposed as described, for example, in Japanese Unexamined Patent Publication No. 2000-284056. The radiation image detector described above includes a radiation image recording medium having a set of layers layered in the order of a first electrode layer configured to transmit radiation; a recording photoconductive layer configured to generate charges when exposed to radiation; a charge transport layer configured to act as substantially an insulator against the charges of the latent image and as substantially a conductor for the transport charges having opposite polarity to that of the charges of the latent image; a reading photoconductive layer configured to generate charges when exposed to reading light; and a second electrode layer having first linear electrodes extending linearly and configured to transmit reading light, and second linear electrodes extending linearly and configured to block reading light, in which the first and second linear electrodes are disposed alternately in parallel. In the radiation image detector described above, the radiation is irradiated on the detector from the side of the first electrode layer, and the radiation image is recorded by storing charges of the latent image in accordance with the dose of radiation irradiated thereon at the interface between the recording photoconductive layer and charge transport layer. Thereafter, the radiation image stored in the detector is read out as electrical signals by scanning the reading light extending linearly in the direction substantially orthogonal to the longitudinal direction of the linear electrodes from the side of the second electrode layer in the longitudinal direction of the linear electrodes and detecting the charges stored in the detector, that is, when the reading light is irradiated on the detector, charge-pairs are generated in the reading photoconductive layer and either negative or positive charges of the charge-pairs couple with the charges of the latent image stored in the storage section of the detector, while the charges of opposite polarity are detected by charge amplifiers connected to the first or second linear electrodes, thereby the radiation image stored in the detector is read out as electrical signals.

Here, when reading out electrical signals from the radiation image detector by scanning the linear reading light as described above, the switches on the charge amplifiers are switched sequentially in the direction substantially orthogonal to the longitudinal direction of the linear electrodes at a predetermined timing for each scanning line of the reading light so that respective electrical signals, each corresponding to each of the pixels forming the radiation image are outputted sequentially from the charge amplifiers in accordance with the switching. Thus, the switching timing of the charge amplifiers for each scanning line must be synchronized according to the scanning of the reading light in the longitudinal direction of the linear electrodes. In this connection, devices for converting a mechanical traveling speed into an electrical pulse signal, such as linear or rotary encoders, have been separately provided, and the synchronization signals generated by these devices have been used to implement the switching for each scanning line.

When the synchronization signal is generated by the linear or rotary encoder described above, however, discrepancies may arise between the traveling speed of the reading light source and the synchronization signal outputted from the encoder, causing certain irregularities and the like to be developed in the radiation image formed by the electrical signals read out from the radiation image detector, thereby the image quality is degraded. Further, the encoder and the like must be provided separately, so that the reading device becomes more complicated, thereby downsizing of the reading device is difficult. Still further, it requires regular maintenance for mechanical adjustments.

SUMMARY OF THE INVENTION

In recognition of the circumstance described above, it is an object of the present invention to provide a radiation image detector capable of generating an appropriate synchronization signal that corresponds to the traveling speed of the reading light source in the longitudinal direction of the linear electrodes with a simple structure.

The radiation image detector of the present invention comprises a radiation image recording section configured to record a radiation image by storing charges generated therein in proportion to the dose of radiation irradiated thereon; a detecting section having a striped electrode comprised of a plurality of linear electrodes disposed in parallel for reading out the charges stored in the radiation image recording section, and configured to detect the radiation image as electrical signals by scanning linear reading light extending in the direction substantially orthogonal to the longitudinal direction of the linear electrodes of the striped electrode in the longitudinal direction of the linear electrodes of the striped electrode, and reading out the charges using the linear electrodes of the striped electrode at a predetermined readout timing; and a synchronization signal generating section having a synchronization signal generating electrode provided on the radiation image recording section, and configured to read out charges that change cyclically in amount from the radiation image recording section using the synchronization signal generating electrode by scanning the reading light, and generate a synchronization signal to be used for the readout timing based on the charges read out from the radiation image recording section through the synchronization signal generating electrode.

The term "change cyclically in amount" described above means that the charges change in amount to greater than or equal to a predetermined threshold level at a certain time interval, or the charges change in amount to less than or equal to a predetermined threshold level at a certain time interval.

In the radiation image detector described above, the synchronization signal generating electrode may be a linear electrode extending in the longitudinal direction of the linear electrodes of the striped electrode, and formed such that a section greater than or equal to a predetermined threshold size and a section smaller than the predetermined threshold size in width in the direction substantially orthogonal to the longitudinal direction of the linear electrodes of the striped electrode are disposed alternately in the longitudinal direction of the linear electrodes of the striped electrode, and the sections greater than or equal to the predetermined threshold size are disposed in the longitudinal direction of the linear electrodes of the striped electrode at a predetermined pitch.

Further, in the radiation image detector described above, the synchronization signal generating electrode may be a linear electrode extending in the longitudinal direction of the linear electrodes of the striped electrode described above, and the synchronization signal generating section may include a light blocking section for blocking the reading light and a light transmitting section for transmitting the reading light disposed alternately in the longitudinal direction of the linear electrodes of the striped electrode on the side of the synchronization signal generating electrode on which the reading light is irradiated such that the sections are disposed opposite to the synchronization signal generating electrode, and a plurality of the light blocking sections are disposed in the longitudinal direction of the linear electrodes of the striped electrode at a predetermined pitch.

Also, in the radiation image detector described above, the synchronization signal generating electrode may be a linear electrode extending in the longitudinal direction of the linear electrodes of the striped electrode, and the synchronization signal generating section may include a radiation blocking section for blocking the radiation and a radiation transmitting section for transmitting the radiation disposed alternately in the longitudinal direction of the linear electrodes of the striped electrode on the side of the radiation image recording section on which the radiation is irradiated such that they are disposed opposite to the synchronization signal generating electrode, and a plurality of the radiation blocking sections are disposed in the longitudinal direction of the linear electrodes of the striped electrode at a predetermined pitch.

Still further, in the radiation image detector described above, the synchronization signal generating electrode may be comprised of a plurality of electrode sections disposed in the longitudinal direction of the linear electrodes of the striped electrode at a predetermined pitch.

Here, the term "disposed at a predetermined pitch" means that the sections described above are arranged such that the charges that change in amount to greater than or equal to a predetermined threshold level at a certain time interval, or the charges that change in amount to less than or equal to a predetermined threshold level at a certain time interval may be read out.

Further, the "electrode section", "light blocking section", or "radiation blocking section" may be of any shape, and they may be formed, for example, in rectangle.

In the radiation image detector according to the present invention, a synchronization signal generating electrode is provided on the radiation image recording section, and charges that change cyclically in amount are read out from the radiation image recording section using the synchronization signal generating electrode by scanning the reading light, and the synchronization signal to be used for the readout timing is generated based on the charges read out from the radiation image recording section through the synchronization signal generating electrode, so that an appropriate synchronization signal that corresponds to the traveling speed of the reading light source may be produced with a simple structure.

Further, in the radiation image detector, if the synchronization signal generating electrode is a linear electrode extending in the longitudinal direction of the linear electrodes of the striped electrode, and formed such that a section greater than or equal to a predetermined threshold size and a section smaller than the predetermined threshold size in width in the direction substantially orthogonal to the longitudinal direction of the linear electrodes of the striped electrode are disposed alternately in the longitudinal direction of the linear electrodes of the striped electrode, and the sections greater than or equal to the predetermined threshold size are disposed in the longitudinal direction of the linear electrodes of the striped electrode at a predetermined pitch, the charges that change cyclically in amount may be read out by the electrode sections which are greater than or equal to the predetermined threshold size and the electrode sections which are smaller than the predetermined threshold size, so that the charges that change cyclically in amount may be read out from the radiation image recording section with a simple structure.

Further, in the radiation image detector described above, if the synchronization signal generating electrode is a linear electrode extending in the longitudinal direction of the linear electrodes of the striped electrode, and the synchronization signal generating section includes a light blocking section for blocking the reading light and a light transmitting section for transmitting the reading light disposed alternately in the longitudinal direction of the linear electrodes of the striped electrode on the side of the synchronization signal generating electrode on which the reading light is irradiated such that they are disposed opposite to the synchronization signal generating electrode and a plurality of light blocking sections are disposed in the longitudinal direction of the linear electrodes of the striped electrode at a predetermined pitch, no charges are read out from the radiation image recording section corresponding to the light blocking sections, so that the charges that change cyclically in amount may be read out from the radiation image recording section with a simple structure.

Further, in the radiation image detector described above, if the synchronization signal generating electrode is a linear electrode extending in the longitudinal direction of the linear electrodes of the striped electrode, and the synchronization signal generating section includes a radiation blocking section for blocking the radiation and a radiation transmitting section for transmitting the radiation disposed alternately in the longitudinal direction of the linear electrodes of the striped electrode on the side of the radiation image recording section on which radiation is irradiated such that they are disposed opposite to the synchronization signal generating electrode and a plurality of radiation blocking sections are disposed in the longitudinal direction of the linear electrodes of the striped electrode at a predetermined pitch, no charges are stored in the radiation image recording section corresponding to the radiation blocking sections, so that the charges that change cyclically in amount may be read out from the radiation image recording section with a simple structure.

Still further, in the radiation image detector described above, if the synchronization signal generating electrode is comprised of a plurality of electrode sections disposed in the longitudinal direction of the linear electrodes of the striped electrode, the charges that change cyclically in amount may be read out through the electrode sections described above, that is, the charges that change cyclically in amount may be read out with a simple structure.

DESCRIPTION OF THE PREFERRED EMBODIMENTS

Figure 1:
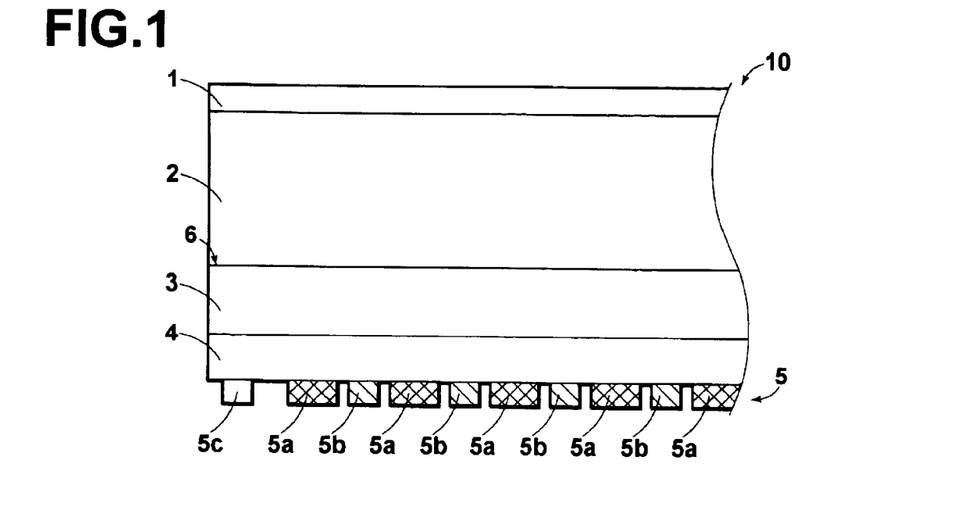
FIG. 1 is a partial cross-sectional view of a radiation image detector according to a preferred embodiment of the present invention.
Figure 2:
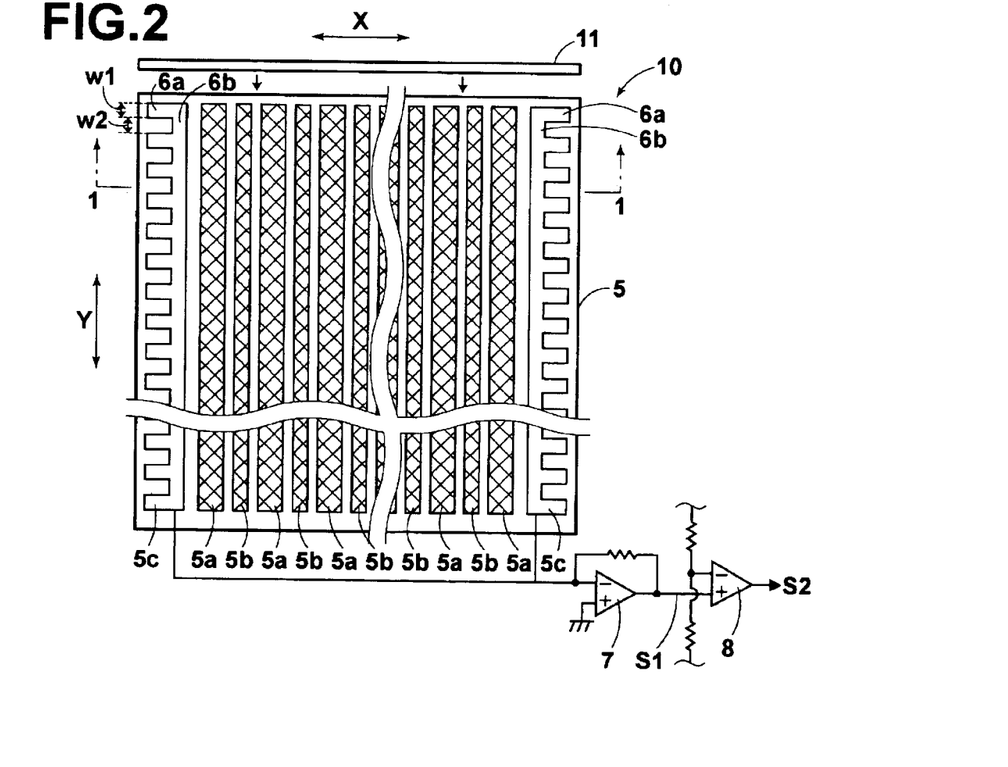
FIG. 2 is a bottom view of the radiation image detector shown in FIG. 1.

Hereinafter, the radiation image detector according to a preferred embodiment of the present invention will be described in detail with reference to the accompanying drawings. Referring first to FIGS. 1 and 2, these Figures show a schematic configuration of the radiation image detector according to a preferred embodiment. FIG. 2 is a bottom view of the radiation image detector shown in FIG. 1, and FIG. 2 is a cross-sectional view of the radiation image detector shown in FIG. 2 taken along the line 1—1.

As shown in FIG. 1, the radiation image detector 10 according to the preferred embodiment comprises a set of layers layered in the order of a first electrode layer 1 configured to transmit an image-carrying radiation; a recording photoconductive layer 2 configured to generate charges when exposed to the radiation transmitted through the first electrode layer; a charge transport layer 3 configured to act as an insulator against the charges generated in the photoconductive layer 2 and as a conductor for transport charges having opposite polarity to that of the charges generated in the photoconductive layer 2; a reading photoconductive layer 4 configured to generate charges when exposed to reading light; and a second electrode layer 5 configured to transmit the reading light. A storage section 6 for storing the charges generated in the recording photoconductive layer 2 is formed between the recording photoconductive layer 2 and charge transport layer 3. In the preferred embodiment, the layers from the first electrode layer 1 up to the reading photoconductive layer 4 constitute the radiation image recording section, and the second electrode layer 2 and charge amplifiers which will be described later constitute the detecting section defined in the appended claims hereto.

The first electrode layer 1 may be made of any material as long as it is capable of transmitting radiation. It may be made of, for example, Nesa film ($SnO_2$), ITO (Indium Tin Oxide), IDIXO (Idemitsu Indium X-metal Oxide: Idemitsu Kosan Co. Ltd.) which is an optically transparent amorphous oxide film, or the like of 50 to 200 nm thickness. In addition, Al or Au of 100 nm thickness may also be used as the first electrode layer 1.

As shown in FIGS. 1 and 2, the second electrode layer 5 comprises a first striped electrode comprised of a plurality of first linear electrodes 5a and a second striped electrode comprised of a plurality of second linear electrodes 5b disposed between the first linear electrodes 5a of the first striped electrode. The first striped electrode is made of a metal such as Al, Cr, or the like which is opaque to the reading light. The second striped electrode may be made of a similar material used for the first electrode layer 1, and is transparent to the reading light. The first striped electrode may be created using the similar material of the second striped electrode first, and then coated with a metal, such as Al or Cr, to make it opaque to the reading light. The second electrode layer 5 also has a synchronization signal generating electrode 5c arranged parallel to the linear electrodes 5a and 5b of the first and second striped electrodes and described above. The synchronization signal generating electrode 5c may be made of any material which is transparent to the reading light. It may be made of, for example, a transparent material, such as ITO or IDIXO, as in the case of the second striped electrode, or it may be formed using a metal, such as Al or Cr, of such thickness as to transmit the reading light.

As shown in FIG. 2, two synchronization signal generating electrodes 5c are provided, each arranged on each side of the first and second linear electrodes 5a and 5b disposed in the manner described above. Also as shown in FIG. 2, each of the synchronization signal generating electrodes 5c is formed such that a section 6a which is greater than or equal to a predetermined threshold size and a section 6b which is smaller than the predetermined threshold size in width in X direction (direction substantially orthogonal to the longitudinal direction of the first and second linear electrodes 5a and 5b) are disposed alternately in Y direction (longitudinal direction of the first and second linear electrodes 5a and 5b). Further, it is formed such that the sections 6a are disposed in Y direction at a predetermined pitch. Although the synchronization signal generating electrode 5c is formed such that the width w1 of the section 6a and the width w2 of the section 6b in Y direction are of the same size, they are not necessarily the same, and the widths w1 and w2 may be of different sizes as long as the sections 6a are disposed at a predetermined pitch. Further, in this preferred embodiment, the electrode 5c is formed such that the widths w1 of the sections 6a are of the same size, but they are not necessarily the same, and they may be of different sizes as long as either ends of each of the sections 6a is disposed in Y direction at a regular interval.

As shown in FIG. 2, the synchronization signal generating electrodes 5c formed in the aforementioned manner is connected to a current detecting amplifier 7 for detecting the current flowing through the electrodes 5c as a voltage signal, and the current detecting amplifier 7 is connected to a comparator circuit 8 for converting the analog signal outputted from the amplifier 7 to a binary signal. A charge amplifier (not shown in FIG. 2) is connected to each of the linear electrodes 5b of the second striped electrode of the second electrode layer 5 for detecting the charges read out by each of the linear electrodes 5b. In the preferred embodiment, the synchronization signal generating electrode 5c, current detecting amplifier 7 and comparator circuit 8 constitute the synchronization signal generating section defined in the appended claims hereto.

The recording photoconductive layer 2 may be made of any material as long as it is capable of generating charges when exposed to radiation. In this preferred embodiment, a-Se-based layer having high quantum efficiency and dark resistance is used as the recording photoconductive layer 2. Preferably, the thickness of the layer is about 500 μm.

As for the charge transport layer 3, it is more preferable, for example, if it has a greater difference in charge mobility between the charges charged on the first electrode layer 1 and those having opposite polarity (for example, not less than $10^2$, more preferably, not less than $10^3$), and materials such as poly N-vinylcarbazole (PVK), organic compounds including N,N-diphenyl-N,N-bis(3-methylphenyl)-[1,1'-biphenyl]-4,4'-diamine (TPD), discotic liquid crystal, and the like, or semiconductor materials such as TPD-dispersed polymers (polycarbonate, polystyrene, PVK), a-Se doped with 10 to 200 ppm of Cl, and the like may be preferably used for the charge transport layer 3.

The reading photoconductive layer 4 may be made of any material as long as it is capable of taking on conductivity when exposed to the reading light. For example, a photoconductive material containing at least one such material as, for example, a-Se, Se-Te, Se-As-Te, nonmetal phthalocyanine, metal phthalocyanine, MgPc (Magnesium phthalocyanie), VoPc (phase II of Vanadyl phthalocyanine), CuPc (Cupper phthalocyanine) as the primary component may be preferably used. Preferably, the thickness of the reading photoconductive layer 4 is about 10 μm.

Hereinafter, the operation of the radiation image detector according to the preferred embodiment of the present invention will be described.

Figure 3A:
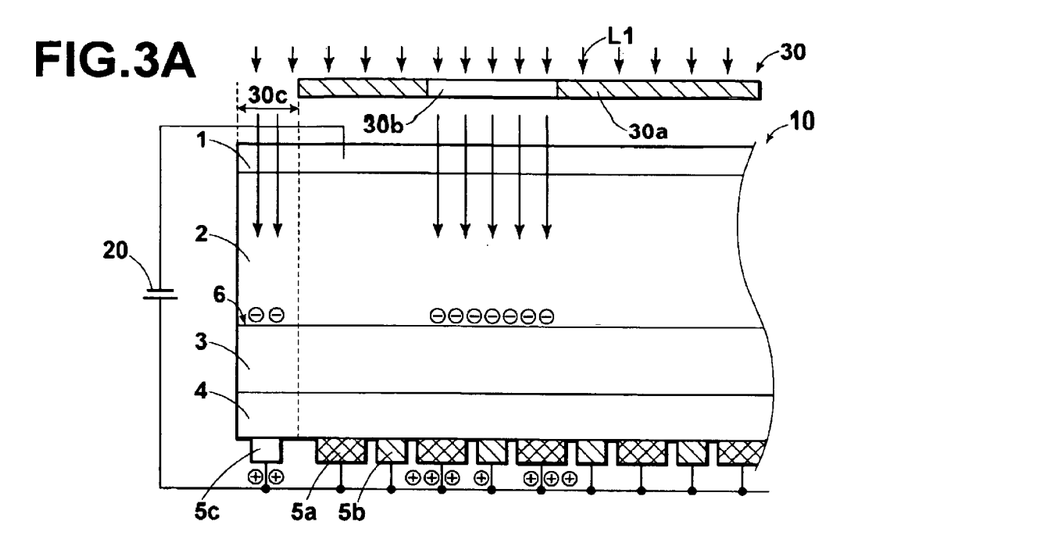
FIG. 3A is a drawing illustrating the operation of the radiation image detector according to a preferred embodiment of the present invention for recording a radiation image.

When a radiation image is recorded, a negative high voltage is applied to the first electrode layer 1 and a positive high voltage is applied to each of the electrodes of the second electrode layer 5 from a high voltage power source 20 to negatively charge the first electrode layer 1 and positively charge the second electrode layer 5 as shown in FIG. 3A. Then, radiation L1 transmitted through a subject 30 is irradiated on the radiation image detector 10 from the side of the first electrode layer 1. The shaded area of the subject 30 is an opaque section 30a that blocks radiation and the non-shaded area is a transparent section 30b that transmits the radiation. The subject 30 is not placed at the location covering an area 30c of the detector 10 corresponding to the synchronization signal generating electrode 5c, and the radiation is irradiated directly on the area 30c from the radiation source without transmitting through the subject 30 as shown in FIG. 3A.

The radiation irradiated on the radiation image detector 10 in the manner described above is transmitted through the first electrode layer 1 and irradiated on the recording photoconductive layer 2. Then, charge-pairs are generated in the area of the recording photoconductive layer 2 exposed to the radiation, and the positive charges of the charge-pairs move to the negatively charged first electrode layer 1 where they couple with the negative charges and disappear. In the mean time, the negative charges of the charge-pairs generated in the manner described above move toward the positively charged second electrode layer 5 and stored into a storage section 6, which is an interface between the recording photoconductive layer 2 and the charge transport layer 3, as shown in FIG. 3A, since the charge transport layer 3 acts as an insulator against the negative charges.

Figure 3B:
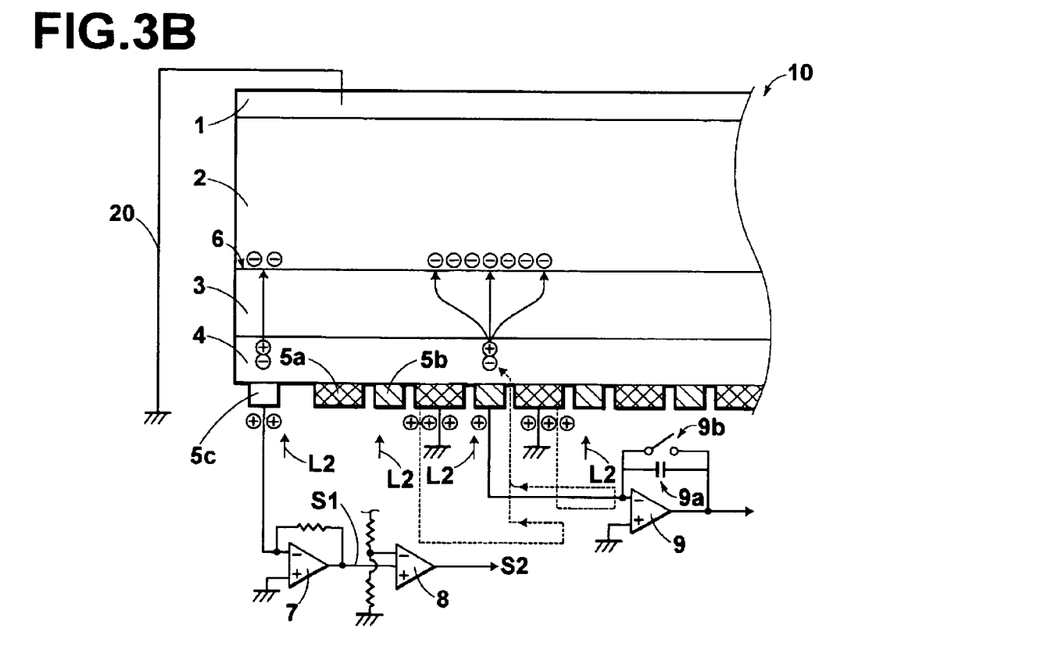
FIG. 3B is a drawing illustrating the operation of the radiation image detector according to a preferred embodiment of the present invention for reading out the radiation image recorded in the detector and generating the synchronization signal.

When reading out the radiation image recorded in the radiation image detector 10 in the aforementioned manner, the first electrode layer 1 and the first linear electrodes 5a of the second electrode layer 5 are grounded as shown in FIG. 3B. At the same time the second linear electrodes 5b of the second electrode layer are connected to respective charge amplifiers 9 and the synchronization signal generating electrode 5c is connected to the current detecting amplifier 7 as shown in FIG. 3B. Then, a reading light source 11 extending linearly in the direction substantially orthogonal to the longitudinal direction of the first and second linear electrodes 5a and 5b is conveyed in the longitudinal direction of the first and second linear electrodes 5a and 5b to scan the linear reading light L2 over the second electrode layer 5 as shown in FIG. 2. When the reading light L2 is irradiated on the second electrode layer 5 as described above, it passes through the second linear electrodes 5b of the second electrode layer 5 and illuminates the reading photoconductive layer 4, which causes charge-pairs to be generated in the reading photoconductive layer 4 as shown in FIG. 3B. Then, the positive charges of the charge-pairs pass through the charge transport layer 3 to couple with the negative charges stored in the storage section 6 formed at the interface between the charge transport layer 3 and the recording photoconductive layer 2 and disappear. In the mean time, the negative charges of the charge-pairs generated in the reading photoconductive layer 4 move to the positive charges charged on the second electrode layer 5. Then, they couple with the positive charges charged on the second linear electrodes 5b of the second electrode layer 5 and also with the positive charges charged on the first linear electrodes 5a through the charge amplifiers 9. Then, the capacitors 9a on the charge amplifiers 9 are charged and the switches 9b on the charge amplifiers 9 are switched sequentially at a predetermined timing in accordance with the scanning of the reading light L2, thereby electrical signals, each corresponding to each of the pixels forming the radiation image are outputted sequentially from the respective charge amplifiers 9.

Here, when detecting the currents by switching the switches 9b on the charge amplifiers 9 for each scanning line of the reading light L2 as described above, the timing of the switching for each scanning line must be synchronized with the scanning of the reading light L2. Consequently, in the preferred embodiment, the synchronization signal for implementing the switching which is synchronized with the irradiation of the reading light L2 for each line is generated based on the signal outputted from the synchronization signal generating electrodes 5c. Hereinafter, the process of generating the synchronization signal described above using the synchronization signal generating electrode 5c will be described.

When the reading light L2 is irradiated on the second electrode layer 5 as described above, charge-pairs are also generated in the area 30c of the reading photoconductive layer 4 corresponding to the synchronization signal generating electrode 5c, and the positive charges of the charge-pairs couple with the negative charges stored in the storage section 6 and disappear, and the negative charges of the charge-pairs couple with the positive charges charged on the synchronization signal generating electrode 5c. Then, a current proportional to the charges stored in the storage section 6 is detected by the current detecting amplifier 7 and outputted after converted to a voltage signal. In FIG. 3B, only a single synchronization signal generating electrode 5c is shown, but in actuality, two synchronization signal generating electrodes 5c are connected to the current detecting amplifier 7, and the current detected by the current detecting amplifier 7 is a combined current read out from the two synchronization signal generating electrodes 5c shown in FIG. 2.

Figure 4A:
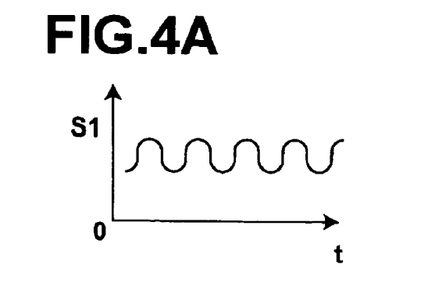
FIG. 4A is a drawing illustrating a voltage waveform of a synchronization signal generated by the radiation image detector according to a preferred embodiment of the present invention.
Figure 4B:
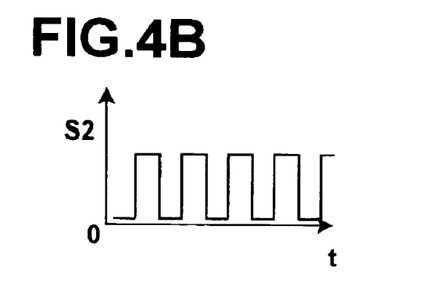
FIG. 4B is a drawing illustrating a reshaped waveform of the synchronization signal shown in FIG. 4A.

Here, each of the synchronization signal generating electrodes 5c is formed such that the section 6a greater than or equal to a predetermined threshold size and the section 6b smaller than the predetermined threshold size in width in X direction are disposed alternately in Y direction as shown in FIG. 2. Hence, the signal S1 outputted from the current detecting amplifier 7 is an analog signal that varies cyclically in amplitude in accordance with the scanning of the reading light L2 in Y direction as shown in FIG. 4A. The analog signal S1 outputted from the current detecting amplifier 7 is inputted to the comparator circuit 8, where its waveform is reshaped like that as shown in FIG. 4B and outputted.

The signal S2 outputted from the comparator circuit 8 is inputted, for example, to a PLL circuit provided in the subsequent stage, where it is locked as a signal having a predetermined frequency. Then, the signal having the predetermined frequency outputted from the PLL circuit is inputted as the synchronization signal to a control means (not shown) that controls the switching of the charge amplifiers 9 for each scanning line, and the control means controls the switching of the charge amplifiers 9 for each scanning line based on the synchronization signal inputted therein.

According to the radiation image detector 10 of the preferred embodiment described above, a synchronization signal generating electrode 5c is provided on the radiation image recording section and the charges that change cyclically in amount are read out from the image recording section using the synchronization signal generating electrode 5c by scanning the reading light L2, then a synchronization signal to be used for the readout timing is generated based on the charges read out from the radiation image recording section through the synchronization signal generating electrode 5c, so that an appropriate synchronization signal that corresponds to the traveling speed of the reading light source may be generated with a simple structure.

The synchronization signal generating electrode 5c may be formed, for example, such that the sections 6a having a greater width in X direction are disposed in Y direction at a predetermined pitch so that a synchronization signal having the same time cycle as the line cycle, which is the time cycle required for reading out image signals on a single line, or it may be formed such that the sections 6a having a greater width in X direction are disposed in Y direction at a predetermined pitch so that a synchronization signal having a lower frequency than the line cycle described above may be generated, and then a synchronization signal having the same frequency as the line cycle may be obtained by multiplying the frequency of the signal locked by the PLL circuit as described above through a frequency multiplying circuit.

Figure 6:
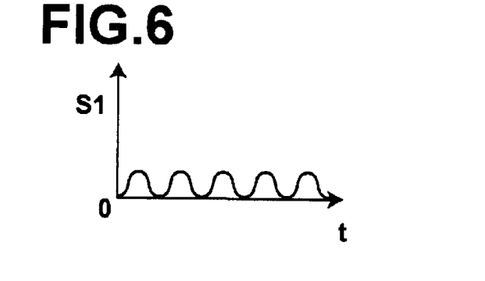
FIG. 6 is a drawing illustrating a voltage waveform of a synchronization signal generated by the synchronization signal generating electrode shown in FIG. 5.
Figure 7:
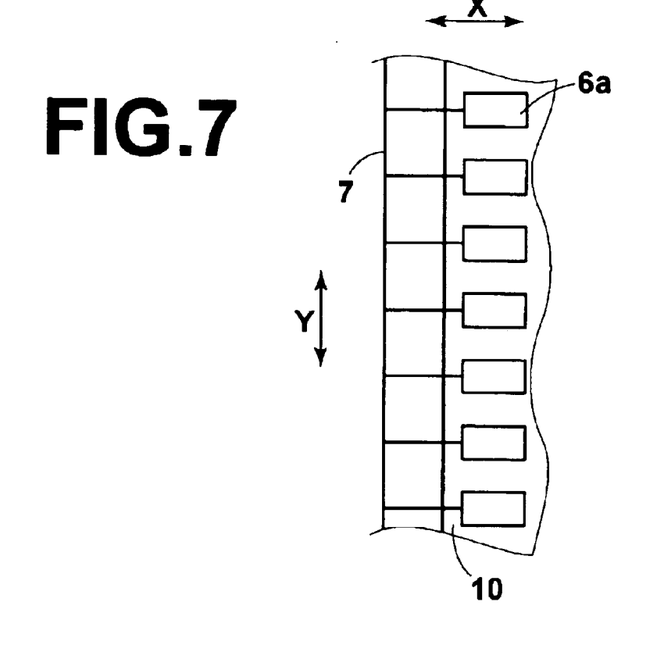
FIG. 7 is a drawing illustrating a synchronization signal generating electrode of the radiation image detector according to still another embodiment of the present invention.

Further, the shape of the synchronization signal generating electrode 5c is not limited to that described above, and it may be, for example, formed such that only the sections 6a having a greater width in X direction may be irradiated by the reading light L2 from the reading light source 11. In this case, an analog signal having a waveform such as that shown in FIG. 6 is outputted from the current detecting amplifier 7 connected to the synchronization signal generating electrode 5c. Further, it may be formed such that only the sections 6a having a greater width in X direction are disposed in Y direction at a predetermined pitch as shown in FIG. 7 without forming the sections 6b having a smaller width in X direction as shown in FIG. 5, and certain lead wires 7 are extended from the sections 6a to connect them to the current detecting amplifier 7.

Figure 8:
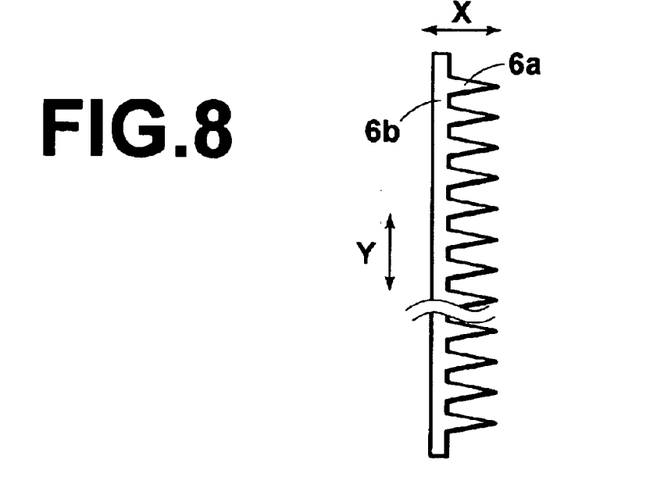
FIG. 8 is a drawing illustrating a synchronization signal generating electrode of the radiation image detector according to still another embodiment of the present invention.

Further, the shape of the synchronization signal generating electrode 5c may be such that the section 6a having a greater width in X direction has a wedge-like shape as shown in FIG. 8.

Figure 5:
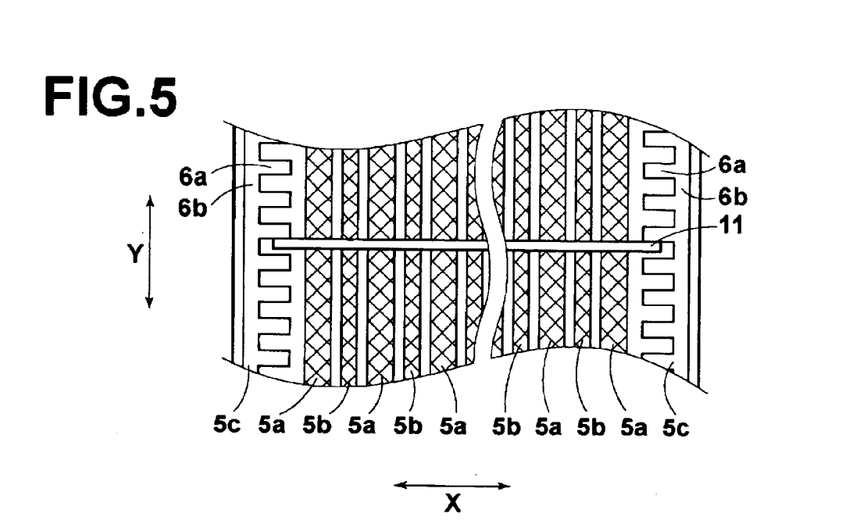
FIG. 5 is a drawing illustrating a synchronization signal generating electrode of the radiation image detector according to another embodiment of the present invention.
Figure 9A:
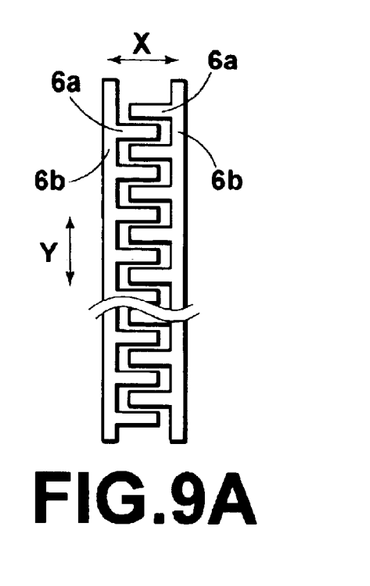
FIG. 9A is a drawing illustrating a synchronization signal generating electrode of the radiation image detector according to still another embodiment of the present invention.
Figure 9B:
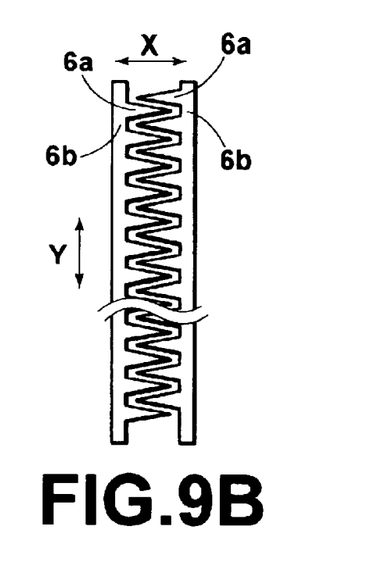
FIG. 9B is a drawing illustrating a synchronization signal generating electrode of the radiation image detector according to still another embodiment of the present invention.
Figure 10:
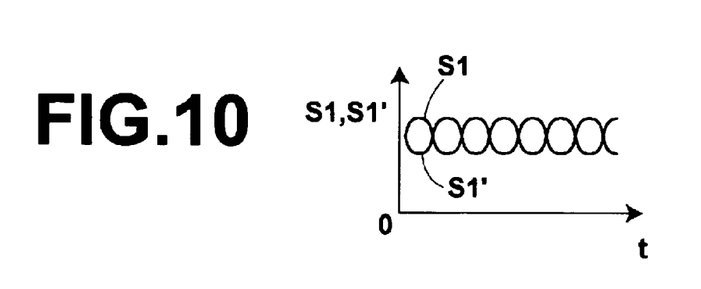
FIG. 10 is a drawing illustrating a voltage waveform of a synchronization signal generated by the synchronization signal generating electrode shown in FIGS. 9A and 9B.

Still further, it may be configured with two synchronization signal generating electrodes 5c as shown in FIGS. 2 and 5, or in FIG. 8 such that the sections 6a having a greater width in X direction of one of the electrodes are engaged with those of the other as shown in FIGS. 9A and 9B. When the synchronization signal generating electrode 5c is configured in the manner described above, the current detecting amplifier 7 connected to the two synchronization signal generating electrodes 5c outputs two analog signals, a signal S1 which is based on the current outputted from one of the electrodes, and a signal S1' which is based on the current outputted from the other electrode as shown in FIG. 10. If the synchronization signal generating section is configured to generate the synchronization signal based on the difference between the two analog signals described above, more clear synchronization signal with less noise may be obtained. The two synchronization signal generating electrodes 5c described above may be arranged closely with each other as shown in FIGS. 9A and 9B, or they may be disposed on the ends of the radiation image recording section respectively.

Figure 11:
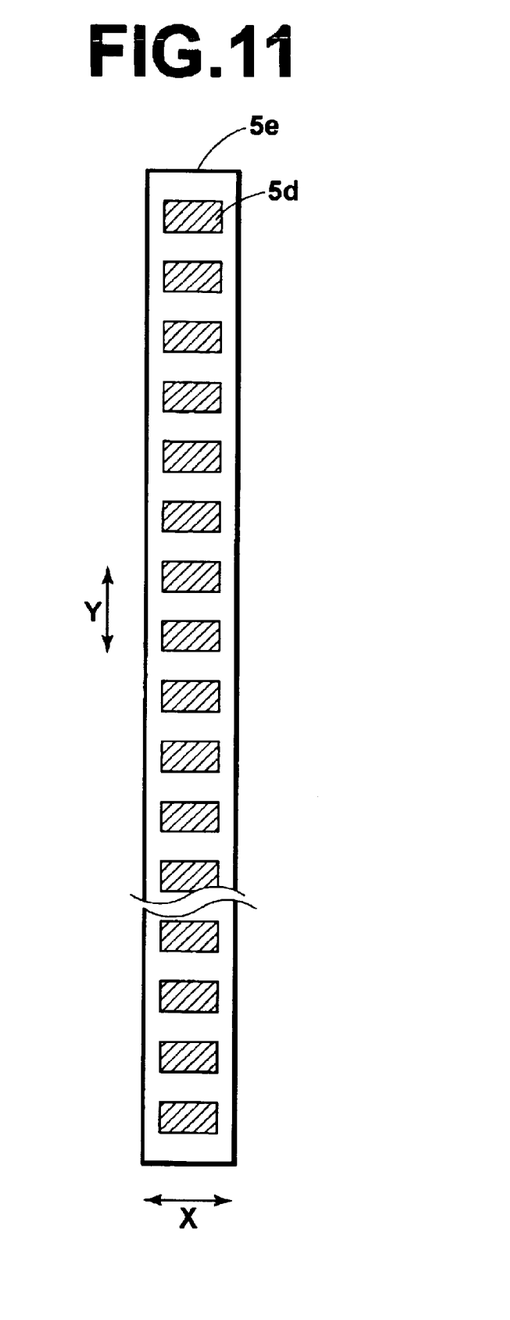
FIG. 11 is a drawing illustrating a synchronization signal generating electrode of the radiation image detector according to still another embodiment of the present invention.

Further, the synchronization signal generating section may include a linear synchronization signal generating electrode 5e formed on the radiation image recording section with light blocking sections 5d for blocking the reading light disposed in Y direction at a predetermined pitch on the side on which the reading light is irradiated as shown in FIG. 11. The section between the light blocking sections 5b is a light transmitting section that transmits the reading light, so that it may be an open space, or it may be made of a material that transmits predetermined reading light.

Further, the synchronization signal generating section may include the linear synchronization signal generating electrode 5e formed on the radiation image recording section described above and a plurality of radiation blocking sections disposed in Y direction at a predetermined pitch on the surface area of the first electrode layer 1 of the radiation image detector 10 on which radiation is irradiated such that they are arranged opposite to the synchronization signal generating electrode. The section between the radiation blocking sections is a radiation transmitting section that transmits radiation, so that it may be an open space, or it may be made of a material that transmits predetermined radiation.

Still further, the form of the synchronization signal generating electrode and the configuration of the synchronization signal generating section are not limited to those described above, and a synchronization signal generating electrode of any shape or a synchronization signal generating section configured in any manner may be used as long as it is capable of reading out charges that change cyclically in amount from the radiation image detector using the synchronization signal generating electrode by scanning the reading light.

Still further, the layer structure of the radiation image detector of the present invention is not limited to that described in the preferred embodiments, and other layers may be added thereto. In short, any layer design or material may be used for the radiation image detector as long as it is capable of generating and storing charges therein when exposed to radiation and outputting the charges using a first and second electrode layers.

What is claimed is:

1. A radiation image detector comprising:
    a radiation image recording section configured to record a radiation image by storing charges generated therein in proportion to the dose of radiation irradiated thereon;
    a detecting section having a striped electrode comprised of a plurality of linear electrodes disposed in parallel for reading out said charges stored in said radiation image recording section, and configured to detect said radiation image as electrical signals by scanning linear reading light extending in the direction substantially orthogonal to the longitudinal direction of said linear electrodes of said striped electrode in said longitudinal direction of said linear electrodes of said striped electrode, and reading out said charges using said linear electrodes of said striped electrode at a predetermined readout timing; and
    a synchronization signal generating section having a synchronization signal generating electrode provided on said radiation image recording section, and configured to read out charges that change cyclically in amount from said radiation image recording section using said synchronization signal generating electrode by scanning said reading light, and generate a synchronization signal to be used for said readout timing based on said charges read out from said radiation image recording section through said synchronization signal generating electrode.

2. A radiation image detector according to claim 1, wherein said synchronization signal generating electrode is a linear electrode extending in the longitudinal direction of said linear electrodes of said striped electrode, and formed such that a section greater than or equal to a predetermined threshold size and a section smaller than said predetermined threshold size in width in the direction substantially orthogonal to said longitudinal direction of said linear electrodes of said striped electrode are disposed alternately in said longitudinal direction of said linear electrodes of said striped electrode, and said sections greater than or equal to said predetermined threshold size are disposed in said longitudinal direction of said linear electrodes of said striped electrode at a predetermined pitch.

3. A radiation image detector according to claim 1, wherein said synchronization signal generating electrode is a linear electrode extending in the longitudinal direction of said linear electrodes of said striped electrode, and said synchronization signal generating section includes a light blocking section for blocking said reading light and a light transmitting section for transmitting said reading light disposed alternately in said longitudinal direction of said linear electrodes of said striped electrode on the side of said synchronization signal generating electrode on which said reading light is irradiated such that said sections are disposed opposite to said synchronization signal generating electrode, and a plurality of said light blocking sections are disposed in said longitudinal direction of said linear electrodes of said striped electrode at a predetermined pitch.

4. A radiation image detector according to claim 1, wherein said synchronization signal generating electrode is a linear electrode extending in the longitudinal direction of said linear electrodes of said striped electrode, and said synchronization signal generating section includes a radiation blocking section for blocking said radiation and a radiation transmitting section for transmitting said radiation disposed alternately in said longitudinal direction of said linear electrodes of said striped electrode on the side of said radiation image recording section on which said radiation is irradiated such that said sections are disposed opposite to said synchronization signal generating electrode, and a plurality of said radiation blocking sections are disposed in said longitudinal direction of said linear electrodes of said striped electrode at a predetermined pitch.

5. A radiation image detector according to claim 1, wherein said synchronization signal generating electrode comprises a plurality of electrode sections disposed in said longitudinal direction of said linear electrodes of said striped electrode at a predetermined pitch.

* * * * *